UNITED STATES PATENT OFFICE.

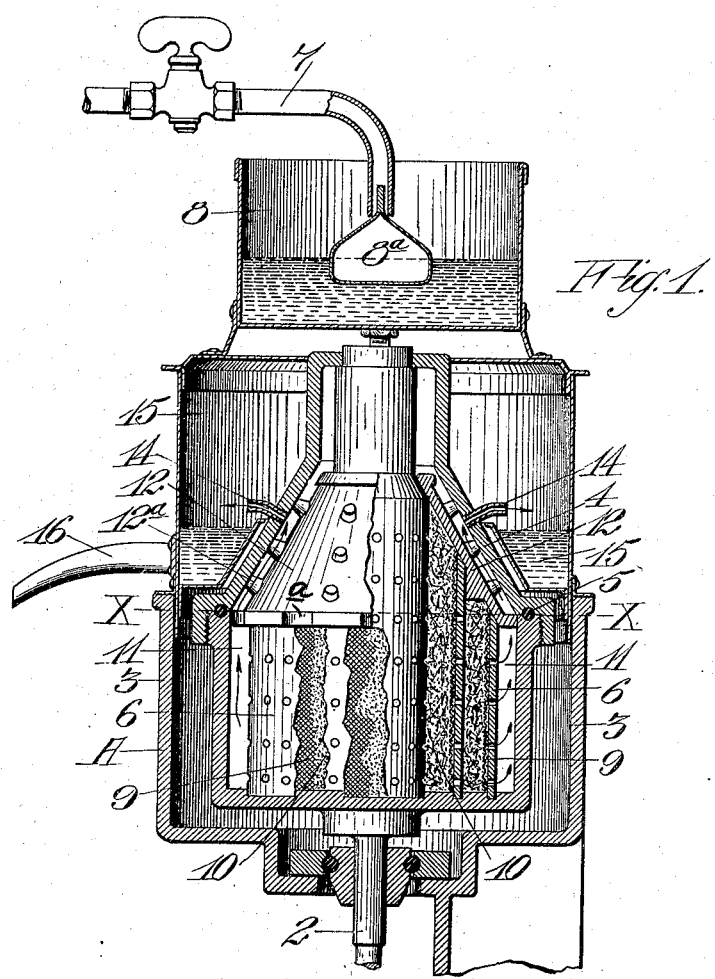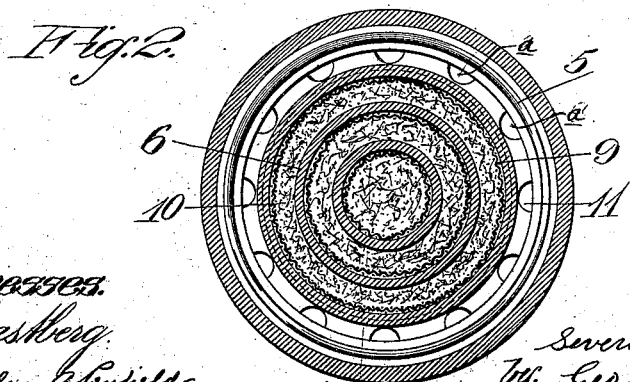

SEVERINAS R. BELLANY, OF FRUITVALE, CALIFORNIA.

CENTRIFUGAL FILTER.

No. 893,299.

Specification of Letters Patent.

Patented July 14, 1908.

Application filed March 28, 1908. Serial No. 423,818.

*To all whom it may concern:*

Be it known that I, SEVERINAS R. BELLANY, citizen of the United States, residing at Fruitvale, in the county of Alameda and State of California, have invented new and useful Improvements in Centrifugal Filters, of which the following is a specification.

My invention relates to a filtering apparatus, and it is especially designed for the purification of water and other liquids.

It consists in the combination of a series of revoluble perforated cylinders, with intermediate filtering media, and means for discharging the filtered liquid from the exterior.

It also comprises details of construction which will be more fully explained by reference to the accompanying drawings, in which—

Figure 1 is a vertical section through the filter. Fig. 2 is a section on line $x$—$x$ of Fig. 1.

It is the object of my invention to provide a means for filtering water and liquids under pressure, so that the work may be performed thoroughly, and at the same time quickly.

As shown in the drawing, A is a cup-shaped receptacle having a shaft 2 which is turnable in suitable bearings, and to which power may be applied to rapidly rotate the receptacle A. This receptacle is here shown as contained in an outer casing 3.

The receptacle A has a convergent cap 4 which is screwed or otherwise secured upon the top of the receptacle A, with a suitable water-tight gasket 5. Within this receptacle A are a series of metal cylinders 6, spaced apart as shown, and each one perforated with holes. The upper portion, which is covered by the hood 4, is correspondingly convergent; and these perforated cylinders are made of decreasing height from the inner one to the outer one, the latter having a little greater height than the depth of the container A.

Through a pipe 7 liquid is admitted into the upper portion 8 of the apparatus, and the supply is regulated by a rising and falling float 8ª, which moves in unison with the discharge of the liquid from the chamber 8. The liquid passes from this chamber downward into the innermost of the perforated cylinders 6. Exterior to each of these cylinders is a filtering media of any suitable description. It may be, as shown in the present case, made of wire gauze 9, and the covering of asbestos or other filtering media as at 10; the filtering media lying in each case, contiguous to the inner cylinder, and the wire gauze between the filtering media and the cylinder next exterior thereto so as to form a support for the filter proper.

The apparatus being revolved with any desired degree of rapidity, the water will be thrown out by centrifugal force, passing through the holes in each cylinder successively, and through the intermediate filters until it reaches a chamber 11 exterior to the outer one of the perforated cylinders. From this chamber the water will be carried up between the convergent cap 4 and an inner cap 12 which forms a continuation from the chamber A, and with an annular space between it and the convergent cap 4. Cap 12 has a base flange with openings $a$ for the passage of water to the aforesaid space. This space is maintained by suitable knobs or projections as shown at 12ª. The water passing upward through this annular space is delivered into a larger chamber 15 by means of pipes or passages 14. From this outer receiver 15, it may be drawn through any suitable pipe or outlet 16.

Having thus described my invention, what I claim and desire to secure by Letters Patent is—

1. In a filtering apparatus, a vertically revoluble receptacle having an upwardly convergent cap, perforated metal cylinders concentric with the chamber and cap lying one within the other, filtering media fixed between said cylinders, a regulating float-containing chamber connected with the interior of the inner perforated cylinder and having a means for supply, a chamber exterior to the filters, passages through which the filtered water is delivered through the convergent hood, an exterior receiving chamber and means for withdrawing liquid therefrom.

2. In an apparatus of the character described, a vertically disposed chamber having a cone-shaped removable cap, a vertical shaft upon which said chamber is mounted and revoluble, a series of perforated, open-ended cylinders fitting within the chamber and cone, and increasing in height from the outermost to the innermost, filtering media occupying the space between said cylinders, a supply pipe, a float chamber into which it opens, connection between said float chamber and the interior of the innermost perforated cylinder, a receiving chamber for filtered liquid between the outermost perforated cylinder and the interior of the containing chamber, an exterior casing, passages opening through the chamber into said casing, and a draw off pipe connected therewith.

In testimony whereof I have hereunto set my hand in presence of two subscribing witnesses.

SEVERINAS R. BELLANY.

Witnesses:
   GEO. H. STRONG,
   CHARLES A. PENFIELD.